United States Patent [19]
Itzkan et al.

[11] 3,868,590
[45] Feb. 25, 1975

[54] NARROW BANDWIDTH DYE LASER
[75] Inventors: Irving Itzkan, Boston; Robert F. Caristi, Stoneham, both of Mass.
[73] Assignee: AVCO Everett Research Laboratory, Inc., Everett, Mass.
[22] Filed: May 2, 1973
[21] Appl. No.: 356,304

[52] U.S. Cl. ............................................ 331/94.5 C
[51] Int. Cl. ................................................ H01s 3/08
[58] Field of Search ............ 350/212, 181; 331/94.5

[56] References Cited
UNITED STATES PATENTS
| | | | |
|---|---|---|---|
| 3,426,294 | 2/1969 | Koester | 331/94.5 |
| 3,670,258 | 6/1972 | Magnante | 331/94.5 |
| 3,684,979 | 8/1972 | Myer et al. | 331/94.5 |

Primary Examiner—William L. Sikes
Attorney, Agent, or Firm—Gary M. Gron, Esq.; Charles M. Hogan, Esq.; Melvin E. Frederick, Esq.

[57] ABSTRACT

A dye laser has a dye cell containing a lasable dye material. A diffraction grating and a partially reflective mirror form an optical cavity having an axis through the dye cell coincident with the axis of a focused pumping radiation beam from a pulsed nitrogen laser. A lens system comprising a quartz rod and a collimating lens is positioned between the cell and the diffraction grating to illuminate a greater area of the grating and thus narrow the bandwidth of the laser beam produced without substantially increasing the length of the optical cavity.

10 Claims, 4 Drawing Figures

PATENTED FEB 25 1975

3,868,590

NARROW BANDWIDTH DYE LASER

This invention relates to stimulated radiation produced in materials that are dyes or have properties similar to those of dyes.

"Dye lasers" have been developed recently which produce stimulated radiation in various organic solutions. Discussions of this process may be found in an article by Sorokin et al., IBM Journal, Volume II, page 130, March 1967.

One of the advantages of a dye laser is that it has a wide spectral range and tunability at very low cost simply by changing the dye solution. These lasers may also be tuned by the use of a diffraction grating, as pointed out in U.S. Pat. No. 3,684,979 entitled "Transverse Dye Laser Stimulation with a Pulsed Nitrogen Laser," Myer et al. inventors, issued on Aug. 15, 1972 and of common assignment with the present invention. One of the problems with the prior art dye lasers is that the bandwidth of a selected laser beam produced with a diffraction grating alone is not as precise as necessary for truly precise laboratory work.

One method for improving the bandwidth characteristics of a dye laser is to illuminate a greater number of lines on the diffraction grating. However, with present optical systems the length of the optical cavity is greatly increased. Certain lasing materials are difficult to stimulate. When these materials are pumped by a pulsed laser, the pumping pulse terminates before the laser beam has time to be reflected through the lengthened optical cavity to produce an output beam. The above problems are solved in a dye laser of the type generally referred to above by a lens system positioned between a dye cell and a selective wavelength reflector, for substantially diverging within a short distance and collimating the laser beam to illuminate an increased area of the selective wavelength reflector to narrow the bandwidth of the laser beam produced.

The above and other related features of the present invention will be apparent from a reading of the following description of the disclosure shown in the accompanying drawing and the novelty thereof pointed out in the appended claims.

Figure 1:
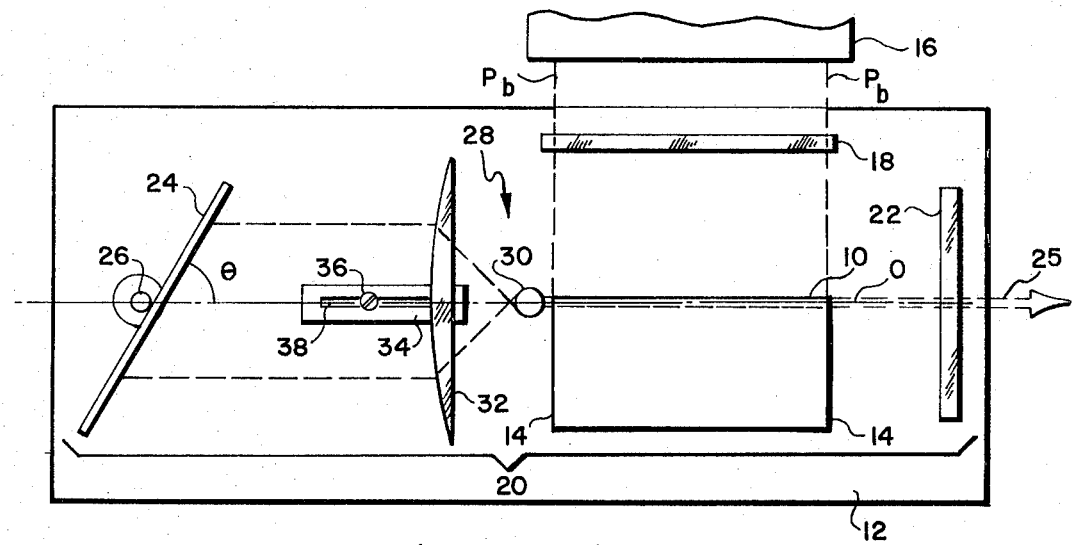
FIG. 1 is a plan view of a dye laser incorporating an improvement which embodies the present invention.
Figure 2:
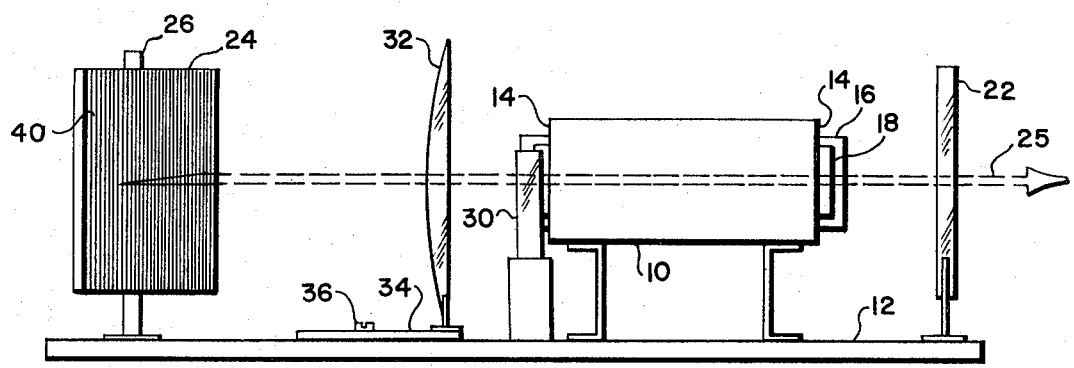
FIG. 2 is an elevational view of the dye laser of FIG. 1.

Referring to FIG. 1, a dye cell 10 is suitably mounted on a base 12. The dye cell generally comprises a container for the liquid formed from optical quality quartz with optical flats 14 at its end faces. The outer surface of the cell 10 is made nonreflective to prevent losses at the air quartz interface. The dye cell is filled with a typical laser material, for example, rhodamine 6G or fluorescein. Many other dye materials capable of lasing may be incorporated in the cell 10, as pointed out in the Myer et al. patent.

The dye material in the container 10 is stimulated by a beam from a pumping laser 16. The pumping laser may be any one of a number of lasers that produce a beam (shown by dashed lines $p_b$) having a rectangular cross section. An excellent laser for this purpose is the Avco Model C-5,000 Pulsed Gas Laser or the Avco Model C-950 Pulsed Gas Laser. These lasers use nitrogen which produces radiation at 3,371 Angstroms in the ultraviolet region for efficient pumping of most laser materials in the dye container 10. It should be pointed out, however, that the system may also operate with a continuous beam laser utilizing material other than nitrogen. The pumping beam $P_b$ is focused to substantially a line along an optical axis 0 within the laser container 10 by a cylindrical lens 18. An optical cavity 20 is formed by a partially reflective mirror 22 and a diffraction grating 24. The diffraction grating 24 generally consists of a reflective surface with a large number of lines ruled on it. As shown in FIG. 1, the angle $\theta$ defined by the plane of the diffraction grating 24 and the optical axis 0 is adjustable by pivoting a post 26 that supports the reflector 24. By varying $\theta$, the wavelength of an output laser beam 25 can be selected.

To narrow the bandwidth of the output laser beam 25 within the confines of the optical cavity, a lens system 28 is used. The lens system 28 is positioned between the cell 10 and the diffraction grating 24 and comprises a first lens 30 having an extremely short focal length which substantially diverges the laser beam and a second collimating lens 32 confocal with the first lens 30. Preferably, the lens 30 is cylindrical and formed from a quartz rod to improve the transmission of ultraviolet light. If lens 32 is the type which is not color corrected its focal length will vary for different wavelengths of light. Consequently, a base 34 for the lens 32 is adjustably positioned relative to the lens 30 by a screw 36 releasably secured to base 12 and extending through a slot 38 in base 34. It should be apparent that other means of adjustable positioning may be used with similar results.

Figure 4:
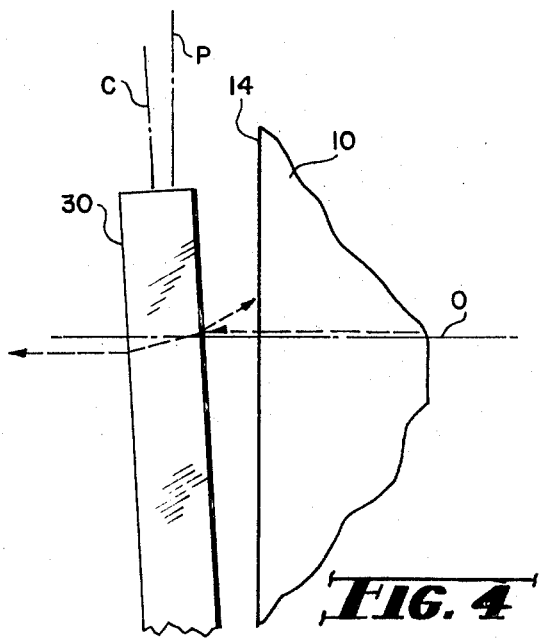
FIG. 4 is a fragmentary elevational view of the cylindrical lens of FIGS. 1 and 2.

As shown particularly in FIG. 4, the longitudinal axis C of the cylindrical lens 30 is angled with respect to a plane P that is normal to the optical axis 0 of the optical cavity. Preferably this angle is approximately one degree.

In operation the pumping laser 16 emits a pulsed beam by pumping radiation $P_b$ of rectangular cross section. Cylindrical lens 18 focuses the pumping beam to a line just inside the outer surface of the dye cell 10 and substantially coincident with the optical axis 0 of the optical cavity 20. The beam of pumping radiation excites the molecules within the dye material to higher energy levels provides the population inversion for stimulated emission to occur in the laser material within the dye cell 10. The optical cavity 20 in combination with the laser medium produces the output beam 25 which emerges from the partially reflecting mirror 22 in the well-known manner.

The laser beam passing to the diffraction grating 24 is substantially diverged by the cylindrical lens 30 which has an extremely short focal length. It is then collimated by the lens 32 to produce illumination of a substantially increased number of lines on the diffraction grating 24. As is evident in FIG. 1, the longitudinal axis of the cylindrical lens 30 is generally parallel to the lines 40 on the diffraction grating 24 so that it diverges the beam in a plane generally normal to the lines to illuminate a greater number of them. This causes a substantial bandwidth narrowing of the beam of a given mean wavelength selected by rotating the diffraction grating 24.

The cylindrical lens 30 has such an extremely short focal length that it permits a substantial increase in the number of lines of the diffraction grating illuminated while requiring substantially no increase in length for the optical cavity 20. This is highly important when a pulsed laser 16 is used for the pumping beam, since it permits the length of the optical cavity 20 to be sufficiently short to permit effective generation of the output beam.

Figure 3:
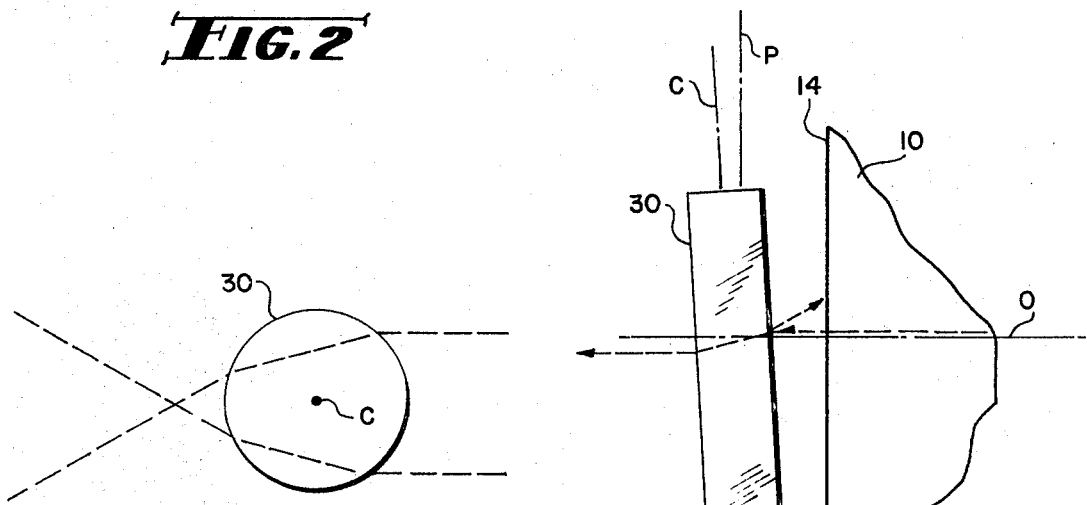
FIG. 3 is a fragmentary highly enlarged view of a cylindrical lens shown in FIGS. 1 and 2.

The cylindrical lens 30 can be easily and economically manufactured to have a diameter sufficiently small to produce an extremely short focal length. As shown in FIG. 3, the diameter of the cylindrical lens 30 is slightly greater than but as close as possible to the nominal width of the beam. The theoretical lower limit of the diameter of the rod is approximately the width of the beam. However, practical limitations of mounting the cylindrical lens 30 necessitate a somewhat greater diameeter. A diameter for cylindrical lens 30 that gives acceptable results is 2 millimeters, which can be easily fabricated by heating and drawing a quartz rod. It has been found that with this procedure a point along the rod that gives optically acceptable optical results can be found and then the rod cut off to use only that portion for the lens system.

It is extremely important that the longitudinal axis C of the cylindrical lens 30 be angled with respect to the plane P, as illustrated in FIG. 4. The reason for this is that if the axis of the cylindrical lens was normal to the optical axis 0 of the optical cavity 20 it would reflect a beam back into the dye cell that is not wavelength selective and the apparatus would not be capable of producing the narrow bandwidth beam. However, when the axis is angled, the portion of the beam that is reflected by the surface of the cylindrical lens 30 is directed away from the optical axis 0 and has no effect on the laser beam produced.

The apparatus described above enables a substantial reduction in bandwidth of typical dye lasers. It permits a narrowing of bandwidth to a width substantially less than that obtainable solely with the use of a diffraction grating. The reduction of bandwidth obtainable depends on the ratio of the focal length of lens 30 to that of lens 32. The cylindrical lens 30 permits this substantial narrowing of the bandwidth within the confines of the optical cavity because of its extremely short focal length. At the same time the cylindrical lens may be easily manufactured to precision dimensions. By adjustably positioning the lens 32 relative to the cylindrical lens 30, a relatively inexpensive collimating lens that is not color corrected may be used. When changing to a different wavelength beam it is simply necessary to readjust the separation between lens 32 relative to that of the cylindrical lens 30.

While the preferred embodiment of the present invention has been described, it should be apparent to those skilled in the art that it may be modified other than that shown without departing from the spirit and scope thereof.

We claim:

1. In an apparatus for producing stimulated radiation in lasable dye materials, said apparatus including a laser pumping means emitting a beam of pumping radiation generally rectangular in cross section, a cell containing lasable dye material, means for focusing said pumping radiation beam substantially to a line within said cell, and a selective wavelength reflector and a partially reflective means forming an optical cavity with a reflecting axis substantially coincident with the line of focus of said pumping radiation beam for producing a laser beam, the improvement comprising:

a lens system positioned between said cell and said selective wavelength reflector and comprising a first cylindrical lens adjacent said cell for receiving and substantially diverging said laser beam and a second spherical lens positioned between said cylindrical lens and said selective wavelength reflector for receiving and collimating said diverged laser beam to illuminate an increased area of said selective wavelength reflector whereby the bandwidth of the laser beam produced by said apparatus is substantially narrowed.

2. Apparatus as in claim 1 wherein said first cylindrical lens of said lens system is a converging lens having a relatively short focal length, said first cylindrical and second spherical lenses being substantially confocal.

3. Apparatus as in claim 2 wherein said first cylindrical lens is positioned so as to converge said laser beam in a plane producing a substantial increase in the area illuminated on the selective wavelength reflector.

4. Apparatus as in claim 3 wherein said selective wavelength reflector is a diffraction grating having a plurality of parallel lines on a reflecting surface and wherein the longitudinal axis of said first cylindrical lens is generally parallel to said lines whereby said cylindrical lens causes an increased number of lines to be illuminated.

5. Apparatus as in claim 3 wherein said first cylindrical lens comprises a quartz rod thereby improving the efficiency of said apparatus in producing an ultraviolet laser beam.

6. Apparatus as in claim 5 wherein the longitudinal axis of said first cylindrical lens is angled from a plane normal to the reflecting axis of said optical cavity, thereby preventing reflecting of said laser beam off the surface of said quartz rod into said cell.

7. Apparatus as in claim 6 wherein the angle of the longitudinal axis of said cylindrical lens is approximately one degree with respect to said normal plane.

8. Apparatus as in claim 3 wherein said first cylindrical lens has a relatively small diameter thereby producing a relatively short focal length to minimize the length of said lens system.

9. Apparatus as in claim 8 wherein the diameter of said cylindrical lens is approximately two millimeters.

10. Apparatus as in claim 3 wherein said selective wavelength reflector is adjustable to produce selected wavelengths and wherein said second spherical lens has a focal length dependent on wavelength transmitted and wherein said apparatus further comprises means for adjustably positioning said second spherical lens with respect to said first cylindrical lens to permit them to be confocal irrespective of the wavelength transmitted.

* * * * *